No. 894,138. PATENTED JULY 21, 1908.
G. J. HAUK.
PIPE LIFTING AND GRIPPING APPLIANCE.
APPLICATION FILED MAY 5, 1908.
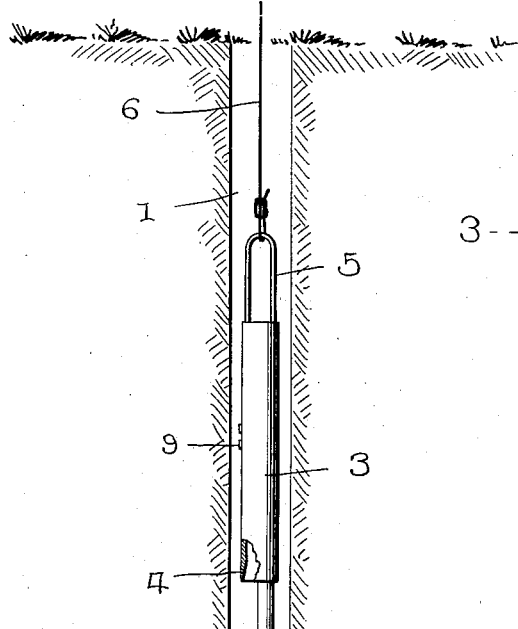
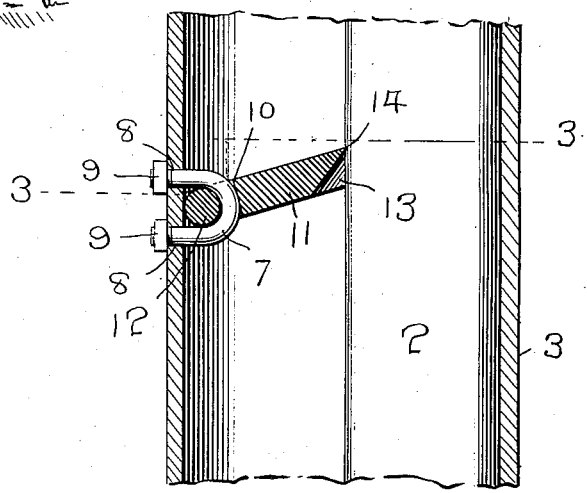
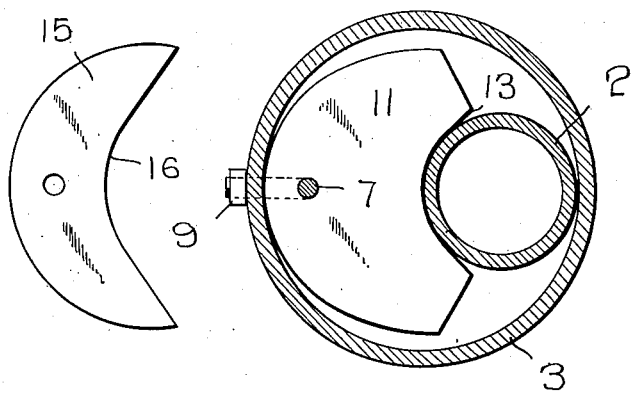
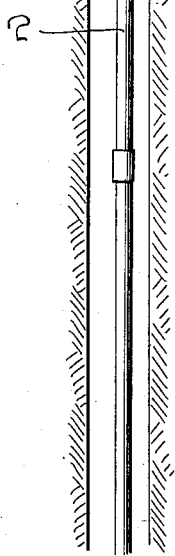
WITNESSES:
Thos. W. Riley
W. E. Lawson
INVENTOR
G. J. Hauk
BY
W. J. Fitzgerald
Attorneys

UNITED STATES PATENT OFFICE.

GEORGE J. HAUK, OF CARMI, ILLINOIS.

PIPE LIFTING AND GRIPPING APPLIANCE.

No. 894,138.　　　　Specification of Letters Patent.　　　　Patented July 21, 1908.

Application filed May 5, 1908. Serial No. 430,983.

*To all whom it may concern:*

Be it known that I, GEORGE J. HAUK, a citizen of the United States, residing at Carmi, in the county of White and State of Illinois, have invented certain new and useful Improvements in Pipe Lifting and Gripping Appliances; and I do hereby declare the following to be a full, clear, and exact description of the invention, such as will enable others skilled in the art to which it appertains to make and use the same.

This invention relates to new and useful improvements in pipe extractors and has relation more particularly to devices of this character employed in removing pipes from wells.

It is an object of the invention to provide a novel device of this character which will effectually grasp or clamp the pipe or pipe sections to be extracted.

It is also an object of the invention to provide a novel device of this character which will readily engage a pipe or pipe section.

It is also an object of the invention to provide a novel device of this character which will be simple in construction and comparatively inexpensive to manufacture.

With the above and other objects in view the invention consists of the details of construction and in the novel arrangement and combination of parts to be hereinafter more particularly referred to.

In describing the invention in detail reference will be had to the accompanying drawings forming part of this specification, wherein like characters of reference denote corresponding parts in the several views, and in which, Figure 1 is a sectional view illustrating a well with the invention applied thereto, said invention being in elevation. Fig. 2 is a fragmentary, enlarged sectional view illustrating the invention in operation. Fig. 3 is a sectional view taken on the line 3—3 of Fig. 2. Fig. 4 is a view in top plan of a slightly modified form of clamping plate.

In the drawings 1 denotes a well having therein the pipe sections 2 as is ordinary. The pipe extractor comprises a cylindrical body 3 of a diameter greater than the diameter of the pipe or pipe sections usually employed. The lower end of the bore of the cylinder is enlarged as at 4 in order to assure the passage of the cylinder over a pipe section more especially when said section is resting against the side of the wall.

The upper or opposite end of the cylinder has secured thereto a bail 5. To this bail is secured any desired elevating or lifting means, in the present instance shown as a cable.

Projecting within the cylinder 3, preferably centrally of its length is an eye 7 which may be formed as desired, but preferably as shown in the drawings. In the drawings an approximate U-shaped staple is disclosed having its free ends passing through openings 8 in the wall casing, said free ends being threaded and engaged by retaining or clamping nuts 9.

Before being applied in position the eye or staple 7 is passed through an opening 10 in a clamping plate 11, the inner wall 12 of the opening 10 being rounded in order that the plate 11 may have a rocking or swinging movement. The plate 11 is approximately semi-circular in form and has a curved recess 13 in its broad end. This curved recess is adapted by gravity to fall against the pipe section 2 to be removed. The wall of this recess 13 is inclined to form a cutting edge 14 as is more particularly shown in Fig. 2. This cutting edge will bind or clamp against the pipe section 2 when the cylinder 3 is elevated and causes the pipe sections 2 to rise with the cylinder as is believed to be obvious.

In Fig. 4 a slightly modified form of clamping plate is shown. This plate 15 is provided with a recess 16 entirely across its broad end. This is done when a pipe of unusual size is to be extracted.

It might be well to state that these clamping plates can be of any size and the recess therein of any configuration, the same being determined by the necessities of practice.

What I claim is:

A pipe extractor comprising a cylinder having one end tapered, a bail at the opposite end of the cylinder, said cylinder being provided with perforations, a staple within the cylinder having its free end projecting through the perforations, retaining means exteriorly of the cylinder engaging the projected ends of the staple and a clamping plate having a perforation, the staple passing through the perforation and holding the plate within the cylinder.

In testimony whereof I have signed my name to this specification in the presence of two subscribing witnesses.

GEORGE J. HAUK.

Witnesses:
JOHN HAUK,
JACOB RENSCHLER.